(12) United States Patent
Beuhler et al.

(10) Patent No.: US 6,391,937 B1
(45) Date of Patent: May 21, 2002

(54) POLYACRYLAMIDE HYDROGELS AND HYDROGEL ARRAYS MADE FROM POLYACRYLAMIDE REACTIVE PREPOLYMERS

(75) Inventors: Allyson Beuhler, Downers Grove; John McGowen, Crystal Lake, both of IL (US)

(73) Assignee: Motorola, Inc., Northfield, IL (US)

( * ) Notice: Subject to any disclaimer, the term of this patent is extended or adjusted under 35 U.S.C. 154(b) by 0 days.

(21) Appl. No.: 09/344,217

(22) Filed: Jun. 25, 1999

Related U.S. Application Data

(60) Provisional application No. 60/109,821, filed on Nov. 25, 1998.

(51) Int. Cl.[7] .......................... C03F 7/027; C12Q 1/68; G01N 33/53

(52) U.S. Cl. ................. 522/152; 522/117; 522/121; 526/304; 526/307.2; 526/307.6; 526/307.7; 428/474.4; 430/281.1; 430/283.1; 430/287.1; 435/6; 435/7.1; 435/287.2

(58) Field of Search ............................... 522/113, 117, 522/121, 152; 430/281.1, 286.1, 183.1, 187.1; 427/510, 508; 428/474.4; 435/6, 7.1, 287.2; 526/304, 307.2, 307.6, 307.7

(56) References Cited

U.S. PATENT DOCUMENTS

| | | | |
|---|---|---|---|
| 4,719,615 A | | 1/1988 | Feyrer et al. |
| 5,002,582 A | | 3/1991 | Guire et al. |
| 5,202,193 A | | 4/1993 | Sumi et al. |
| 5,292,821 A | | 3/1994 | Takaki et al. |
| 5,399,269 A | | 3/1995 | Moradi-Araghi |
| 5,552,270 A | | 9/1996 | Khrapko et al. |
| 5,736,257 A | * | 4/1998 | Conrad et al. |
| 5,741,700 A | | 4/1998 | Ershov et al. |
| 5,756,050 A | | 5/1998 | Ershow et al. |
| 5,770,721 A | | 6/1998 | Ershov et al. |
| 5,942,555 A | | 8/1999 | Swanson et al. |
| 5,962,578 A | * | 10/1999 | Beihoffer et al. |
| 6,007,833 A | | 12/1999 | Chudzik et al. |

FOREIGN PATENT DOCUMENTS

| | | |
|---|---|---|
| EP | 226470 | 6/1987 |
| WO | WO 91/07087 | 5/1991 |
| WO | WO9216655 | 10/1992 |
| WO | WO9504833 | 8/1994 |
| WO | WO9504834 | 2/1995 |
| WO | WO9727329 | 7/1997 |
| WO | WO9827229 | 6/1998 |
| WO | WO9828444 | 7/1998 |

OTHER PUBLICATIONS

Finter, J. et al., "A New Class of Photopolymers with Pendent Dimethylmaleimde Groups," *Die Angewandte Makromolekulare Chemie 133* (1985) 147–170 (Nr. 2143).

Beena, M. et al., "Polymer–Metal Compoexes of Amino Functionalized Divinylbenze–Crosslinkes Polyacrymides", Database Compendex accession Nos. EIX94071916060 and XP00213596, Jun. 1993, p. 1.

(List continued on next page.)

Primary Examiner—Susan W. Berman
(74) Attorney, Agent, or Firm—Brinks Hofer Gilson & Lione

(57) ABSTRACT

The present invention provides polyacrylamide hydrogels (especially polyacrylamide hydrogel arrays) made from prepolymers and polyacrylamide reactive polymers, as well as methods and compositions for preparing the polyacrylamide hydrogels or hydrogel arrays. The method advantageously provides greater control of polyacrylamide pore size and crosslink density, allowing, for instance, preparation of a polyacrylamide hydrogel appropriate for use with DNA. Furthermore, the methods and compositions can be employed in commercial processes.

31 Claims, 6 Drawing Sheets

OTHER PUBLICATIONS

Burillo, S.G., "The Gamma–Ray–Induced Crosslinking of Polyacrylamide," Journal of Applied Polymer Sciences, vol. 32, No. 2, 1986, pp 3783–3789.

Lockhart, et al., Nature Biotechnology, vol. 14, pp. 1675–1680 (1996).

Yamazaki, et al., J. Am. Chem. Soc., vol. 91, p. 520 (1969).

Cargill, et al., J. Org. Chem., vol. 36, p. 1423.

Talukder et al., Studies on Physical Properties of Copolymeric Hydrogels from Functionalised Vinylcinnamate Monomers, Current Trends of Polymer Research in India, pp. 1–2.

* cited by examiner

POLYACRYLAMIDE HYDROGELS AND HYDROGEL ARRAYS MADE FROM POLYACRYLAMIDE REACTIVE PREPOLYMERS

This Application claims the benefit of domestic priority of provisional application 60/109,821, filed Nov. 25, 1998.

TECHNICAL FIELD OF THE INVENTION

The present invention provides polyacrylamide hydrogels (particularly polyacrylamide hydrogel arrays) that are made from prepolymers (including especially polyacrylamide reactive polymers), as well as compositions and novel methods for their preparation. In particular, the various elements of the invention allow preparation of a polyacrylamide hydrogel having a specific pore size (and a more uniform hydrogel pore size) that is appropriate, for instance, for DNA applications, and further desirably is non-opaque. Additionally, the polyacrylamide reactive prepolymer used for crosslinking to obtain the polyacrylamide hydrogel is of sufficient viscosity that it can be employed in a commercial coating process.

BACKGROUND OF THE INVENTION

Acrylamide ($CH_2$=$CHCONH_2$; C.A.S. 79-06-1; also known as acrylamide monomer, acrylic amide, propenamide, and 2-propenamide) is an odorless, free-flowing white crystalline substance that is used as a chemical intermediate in the production and synthesis of polyacrylamides. These high molecular weight polymers have a variety of uses and further can be modified to optimize nonionic, anionic, or cationic properties for specified uses.

Polyacrylamide hydrogels are especially employed as molecular sieves for the separation of nucleic acids, proteins, and other moieties, and as binding layers to adhere to surfaces biological molecules including, but not limited to, proteins, peptides, oligonucleotides, polynucleotides, and larger nucleic acid fragments. The gels currently are produced as thin sheets or slabs, typically by depositing a solution of acrylamide monomer, a crosslinker such methylene bisacrylamide, and an initiator such as N,N,N',N'-tetramethylethylendiamine (TEMED) in between two glass surfaces (e.g., glass plates or microscope slides) using a spacer to obtain the desired thickness of polyacrylamide. Generally, the acrylamide polymerization solution is a 4–5% solution (acrylamide/bisacrylamide 19/1) in water/glycerol, with a nominal amount of initiator added. The solution is polymerized and crosslinked either by ultraviolet (UV) radiation (e.g., 254 nm for at least about 15 minutes, or other appropriate UV conditions, collectively termed "photopolymerization"), or by thermal initiation at elevated temperature (e.g., typically at about 40° C.). Following polymerization and crosslinking, the top glass slide is removed from the surface to uncover the gel. The pore size (or "sieving properties") of the gel is controlled by changing the amount of crosslinker and the % solids in the monomer solution. The pore size also can be controlled by changing the polymerization temperature.

In the fabrication of polyacrylamide hydrogel arrays (i.e., patterned gels) used as binding layers for biological molecules, the acrylamide solution typically is imaged through a mask during the UV polymerization/crosslinking step. The top glass slide is removed after polymerization, and the unpolymerized monomer is washed away (developed) with water leaving a fine feature pattern of polyacrylamide hydrogel, the crosslinked polyacrylamide hydrogel pads. Further, in an application of lithographic techniques known in the semiconductor industry, light can be applied to discrete locations on the surface of a polyacrylamide hydrogel to activate these specified regions for the attachment of an anti-ligand, such as an antibody or antigen, hormone or hormone receptor, oligonucleotide, or polysaccharide on the surface (e.g., a polyacrylamide hydrogel surface) of a solid support (PCT International Application WO 91/07087, incorporated by reference).

The current approach of making polyacrylamide hydrogels starting from acrylamide monomer has several disadvantages, some of which are described below:

1. The coating process is difficult and expensive to automate because the film thickness is controlled with a spacer and top glass plate. The removal of the top glass plate must be done manually. Due to difficulties automating the process (e.g., viscosity too low for commercial coating methods), the coating of the monomer solution currently is done manually.

2. The reaction time of the acrylamide is excessively long (e.g., typically from about 15 to about 90 minutes at a short wavelength of about 254 nm), making the UV polymerization and crosslinking step incompatible with standard imaging equipment such as mask aligners and photoprinters.

3. The acrylamide in monomer form is a neurotoxin and a carcinogen which makes coating, handling, and waste disposal of the material hazardous and expensive.

4. The polymerization process is inherently difficult to control, and frequently results in random and non-uniform pore size and crosslink density. In particular, using current approaches, it is difficult to obtain a sufficiently rigid polyacrylamide hydrogel having a large enough pore size such as can be employed for use with applications involving DNA or DNA fragments.

Added to these disadvantages are the further problems that crystallization of monomer frequently occurs on commonly used equipment and laboratory surfaces, and exothermic polymerization can occur in coating reservoirs, necessitating the use of stabilizers (which also are known as inhibitors).

The present invention seeks to overcome some of the aforesaid disadvantages of the prior art. In particular, the present invention provides polyacrylamide hydrogels (particularly hydrogel arrays) made from prepolymers (and particularly, polyacrylamide reactive polymers), novel methods of preparation, and prepolymer compositions, which avoid these difficulties attendant the prior art. The present invention can be employed in an economic fashion in commercial processes which require polyacrylamide hydrogels/hydrogel pads, thus reducing manufacturing times and enhancing throughput. The present invention further provides improved control of crosslink density, resulting in a more uniform hydrogel pore size, and production of a polyacrylamide hydrogel appropriate for use with DNA. These and other objects and advantages of the present invention, as well as additional inventive features, will be apparent from the description of the invention provided herein.

BRIEF SUMMARY OF THE INVENTION

The present invention relates to methods for preparing a polyacrylamide hydrogel or hydrogel array comprising: (a) preparing a polyacrylamide reactive prepolymer having a controlled size; and (b) crosslinking the polyacrylamide reactive prepolymer to obtain the polyacrylamide hydrogel or hydrogel array. Making a polyacrylamide hydrogel array preferably comprises additional steps, optionally, developing the pattern in the array, and further optimally selectively removing the uncrosslinked polymer in aqueous solution to produce the hydrogel array. Pattern development desirably is accomplished by exposing the polyacrylamide reactive prepolymer through a photomask. The present invention further provides compositions and novel methods for preparing the polyacrylamide reactive prepolymer. Thus, the invention allows preparation of a specific pore size (and more uniform pore size) polyacrylamide hydrogel which can be employed, inter alia, in applications involving DNA, and optimally, is non-opaque. Furthermore, the methods of the invention are advantageous in that the polyacrylamide reactive prepolymer used for crosslinking to obtain the polyacrylamide hydrogel is of sufficient viscosity that it can be employed in a commercial coating process.

DETAILED DESCRIPTION OF THE INVENTION

Figure 1:
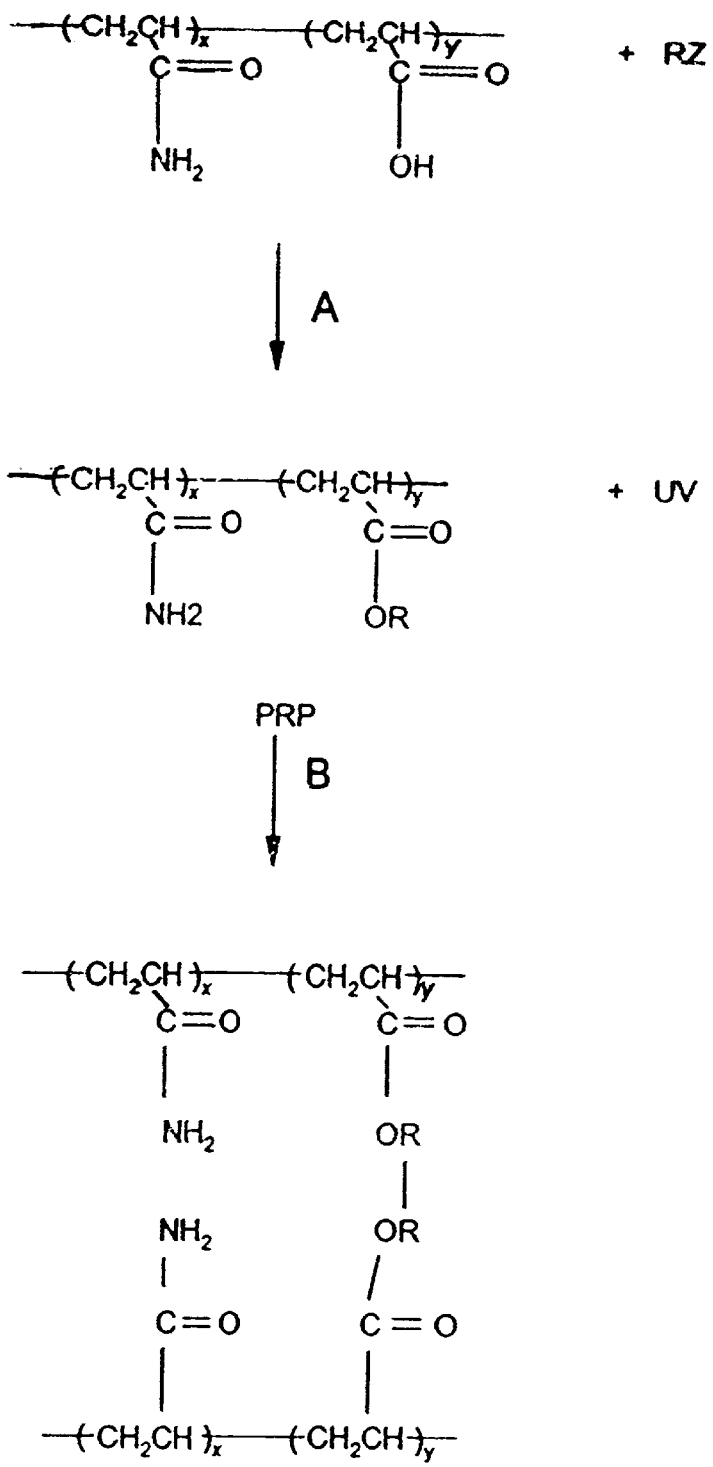
FIG. 1 depicts a reaction scheme according to the invention wherein polyacrylamide co-acrylic acid is functionalized with a crosslinkng group to obtain a polyacrylamide reactive prepolymer (PRP) that includes crosslinking groups (step A), and the PRP is subsequently crosslinked (e.g., by UV exposure through a photo mask) to obtain the crosslinked polyacrylamide hydrogel or hydrogel array (step B). Symbols: x is 40 (and can be varied as described below); y is 1 (and can be varied as described below); R is $CH_2CO_2CH=CHCH_3$ or $CH_2CH_2OCH_2CH=CH_2$ or $H_2C=CHCO$ or another appropriate crosslinking group; Z is any anion (e.g., halide) capable of forming a salt when in combination with R.

The invention relates to a novel process wherein acrylamide is polymerized (i.e., the building up of repeating chemical units into large molecules) in a controlled fashion to obtain a "prepolymer" having a controlled size prior to using the material in a commercial coating process in the production of a polyacrylamide hydrogel or hydrogel array. This prepolymer optimally becomes the starting material for the polyacrylamide hydrogel manufacturing process, and can be coated and imaged using standard commercial equipment. Use of this methodology allows production of a polyacrylamide hydrogel having a uniform pore size, and particularly, having a pore size appropriate for use with DNA.

In particular, the invention relates to methods for preparing a polyacrylamide hydrogel or hydrogel array comprising:

(a) preparing a polyacrylamide reactive prepolymer (e.g., having a controlled size); and (b) crosslinking the polyacrylamide reactive prepolymer to obtain the polyacrylamide hydrogel or hydrogel array.

In particular, the invention provides a method of preparing a polyacrylamide hydrogel that desirably comprises:

(a) providing a polyacrylamide reactive prepolymer;

(b) placing the polyacrylamide reactive prepolymer on a solid support; and (c) crosslinking the polyacrylamide reactive prepolymer to obtain the polyacrylamide hydrogel.

According to this invention, formation of the "polyacrylamide hydrogel" is on (i.e., comprises) a microlocation of a solid support. A "microlocation" (or "location") is any two-dimensional or three-dimensional structure comprised of polyacrylamide that is present on a solid support. A microlocation may be imperfect (e.g., having ridges, kinks, steps, etc.) without ceasing to be a microlocation. Microlocations can be comprised of any variation of polyacrylamide (e.g., acrylamide that is functionalized, activated, modified, or otherwise combined with any appropriate moiety) such as is known in the art.

Also, desirably the hydrogel can be in the form of a hydrogel array. A "hydrogel array" is a combination of two or more microlocations. Preferably an array is comprised of microlocations in addressable rows and columns. Such a hydrogel array as contemplated herein is known in the art, and referred to by a variety of names (e.g., "gel pad array", "polyacrylamide array", etc.). The thickness and dimensions of the polyacrylamide hydrogel and/or hydrogel arrays produced according to the invention can vary dependent upon the particular needs of the user. Optionally, however, with incorporation into a hydrogel array, the hydrogel microlocations will each have a thickness of less than about 50 microns, desirably a thickness of between about 1 and about 40 microns, even more preferably a thickness of between about 3 and about 30 microns, and optimally, will be about 5 microns thick. Furthermore, desirably the hydrogel microlocations in an array are each from about 5 to about 500 microns in size, particularly from about 50 to about 400 microns, and especially from about 100 to about 200 microns.

Preparation of a polyacrylamide hydrogel array preferably comprises additional steps, optionally, developing the pattern in the array, and further optimally selectively removing the uncrosslinked polymer in aqueous solution (e.g., water) to produce the polyacrylamide hydrogel array. Pattern development desirably is accomplished by exposing the polyacrylamide reactive prepolymer through a photomask.

Thus the invention further optimally provides a method of preparing a polyacrylamide hydrogel array, that optimally comprises:

(a) obtaining a polyacrylamide reactive prepolymer;

(b) placing the polyacrylamide reactive prepolymer on a solid support in a pattern; and (c) crosslinking the polyacrylamide reactive prepolymer to obtain the polyacrylamide hydrogel array.

Also, the invention provides a method of preparing a polyacrylamide hydrogel array that optimally comprises:

(a) providing a polyacrylamide reactive prepolymer;

(b) placing the polyacrylamide reactive prepolymer on a solid support; and (c) selectively crosslinking the polyacrylamide reactive prepolymer in a pattern to obtain the polyacrylamide hydrogel array.

Desirably this method further comprises removing the polyacrylamide reactive prepolymer that has not crosslinked using an aqueous solution.

Optionally, the selective crosslinking can be done by:
(a) placing a mask on top of the polyacrylamide reactive prepolymer, and
(b) UV irradiating the mask and the polyacrylamide reactive prepolymer to obtain the pattern.

However it also is desirable that the selective crosslinking is done by using a laser beam to crosslink sections of the polyacrylamide reactive prepolymer in a pattern.

The "solid support" itself optionally is any solid support that can be employed in the invention, e.g., film, glass, Si, modified silicon, ceramic, plastic, or any type of appropriate polymer such as (poly)tetrafluoroethylene, or (poly)vinylidenedifluoride. A preferred solid support according to the invention is glass. The solid support can be any shape or size, and can exist as a separate entity or as an integral part of any apparatus (e.g., bead, cuvette, plate, vessel, and the like). It further is assumed that appropriate treatment of the solid support (e.g., glass) will be undertaken to provide adherence of polyacrylamide to the glass, e.g., with γ-methacryl-oxypropyl-trimethoxysilane ("Bind Silane", Pharmacia), or other appropriate means. In particular, covalent linkage of polyacrylamide hydrogel to the solid support can be done as described in European Patent Application 0 226 470 (incorporated by reference). The solid support also optionally contains (i.e., is attached to) electronic circuitry used in the detection of bit molecules, or microfluidics used in the transport of micromolecules.

According to this invention, a "polyacrylamide reactive prepolymer" is a particular kind of "prepolymer". Namely, a "prepolymer" is a partially polymerized product that typically contains at least one group available for further reaction to participate in producing yet another polymer, or polymeric network structure. As used herein, a "polymer" is comprised of many monomers, and includes "oligomers", which comprise more than one monomer. Preferably, a prepolymer is a polymerized form of acrylamide, and particularly, desirably a prepolymer is a polymerized form of polyacrylamide co-acrylic acid or other vinyl containing reactive group. R, i.e., $[—CH_2CH(CONH_2)—]_x[—CH_2CHR—]_y$, where the values x and y can be varied, but preferably the ratio between the groups is less than 100 to 1. In particular, desirably the ratios are somewhere between the values where x is 70 and y is 30, and the values where x is 40 and y is 1. Optimally, according to the invention, x is 15 and y is 1. There is some variation in the ratios that can be employed, with the key factor being that it is desirable that the value obtained for y is as low as possible, but since they aspect of the polymer is subsequently functionalized (described below), the value employed for y still allows crosslinking to be obtained. The R group can be any group that is capable of crosslinking, but does not do so under the conditions of polymerization specified for the invention. In particular, R can be a group such that the resultant co-monomer is acrylic acid, glycidal methacrylate, N-(6-acryloylhexyl)-2,3,dimethylmaleimide, vinyl cinnamate, vinyl acetate, and others.

The prepolymer preferably has a molecular weight of from about 1,000 to about 300,000 g/mole, especially a molecular weight of from about 5,000 to about 100,000 g/mole, and optimally a molecular weight of from about 5,000 to about 50,000 g/mole. However, the prepolymer also can be modified from this structure, e.g., such as is known in the art, with any appropriate moiety that does not deleteriously impact the further ability of the prepolymer to polymerize/crosslink.

A "polyacrylamide reactive prepolymer" (PRP) is the prepolymer that typically precedes the polyacrylamide hydrogel in the reaction scheme, and from which the polyacrylamide hydrogel is obtained by crosslinking of separate PRPs. The PRP differs from the prepolymer in that the PRP, but not the prepolymer, has been "functionalized" to contain particular reactive groups called "crosslinking groups" or "crosslinkers" (described below). In particular, optimally the PRP has the formula identified as Structure I below:

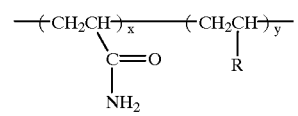

where x and y have the values previously set forth, and R is a crosslinking group. However, the PRP also can be modified from this structure, e.g., such as is known in the art, with any appropriate moiety that does not deleteriously impact the further ability of the PRP to crosslink.

Thus, according to the invention, it is desirable that the second aspect of the foregoing structure (i.e., $[—CH_2CHR—]_y$) comprise less than about 30% (weight percent) in the resulting polyacrylamide reactive prepolymer, and that the first aspect of the foregoing structure (i.e., $[—CH_2CH(CONH_2)—]_x$) comprise more than about 70% by weight. It particularly is preferred that the second aspect of the foregoing structure (i.e., $[—CH_2CHR—]_y$) comprise less than about 10% (weight percent) in the resulting PRP, and that the first aspect of the foregoing structure (i.e, $[—CH_2CH(CONH_2)—]_x$) comprise more than about 90% by weight. And it is especially preferred that the second aspect of the foregoing structure (i.e., $[—CH_2CHR—]_y$) comprise less than about 2% (weight percent) in the PRP, and that the first aspect of the foregoing structure (i..e, $[—CH_2CH(CONH_2)—]_y$) comprise more than about 98% by weight. Thus, according to the invention, the co-monomer acrylic acid containing the crosslinker group (i.e., $[—CH_2CHR—]_y$) desirably comprises from about 2% by 30% by weight of the polyacrylamide reactive polymer. In particular, it is preferred that the resultant PRP comprise from about 0.05% to about 1.5% by weight of the polyacrylamide reactive prepolymer, especially about 1.0% by weight.

In an important and surprising improvement according to the invention, preferably a PRP is of sufficient viscosity (and not too high of a viscosity) such that the PRP can be applied in a commercial coating process to obtain a polyacrylamide hydrogel or hydrogel pad, optimally without need of a spacer or top glass to ensure desired resultant hydrogel thickness. By "commercial coating process" is meant a process employed in industry to contact a solid support with a mixture and thereby produce polyacrylamide, preferably which is adherent to the solid support. Examples of commercial coating processes include, but are not limited to, roller coating, curtain coating, extrusion coating, and offset printing, and spin coating.

Preferably according to the invention, the PRP comprises a viscosity of from about 25 centiPoise to about 500,000 centiPoise, even more desirably, a viscosity of from about 50 centiPoise to about 500,000 centiPoise. Optimally the viscosity is about 200 centiPoise. There accordingly is some latitude in the viscosity that can be applied in the invention, with the most important factor being that the obtained PRP is coatable. Coatability also can be considered in terms of the molecular weight (MW) of the PRP. Generally, with a MW less than about 1,000 g/mole the resultant PRP may become too brittle to properly coat the solid support, with a MW greater than about 300,000 g/mole the resultant PRP may become too thick to coat the solid support. Thus, optimally according to the invention, the viscosity of the PRP will be between about 50 and 500,000 centiPoise.

By way of explanation and not limitation, the increased viscosity of the PRP largely results from the increased molecular size of this prepolymer. The molecular weight of the PRP can differ from that of the prepolymer from which the PRP is obtained, with such difference primarily being equal to the value of the molecular size of any crosslinker ("R") that is present in the PRP, but is not present in the prepolymer used to obtain the PRP. Thus, desirably according to the invention, the PRP, like the prepolymer, has a controlled size, and the size of the PRP is "about" the same size as that of the prepolymer, with the size of the PRP generally being from about 100 to about 500 grams/mole larger than the size of the prepolymer from which it is obtained due to inclusion in the PRP structure of crosslinker—although smaller or larger size crosslinking groups also can be employed, so long as their size does not impair reactivity, crosslinking, or polymerization.

A "crosslinker" or "crosslinking group" is a bifunctional chemical entity that serves to covalently link at least two target agents (i.e., the functional groups being connected by the crosslinker or crosslinking group). According to the invention, a crosslinker or crosslinking group can be heterobifunctional, i.e., having different chemical reactivities on either end of the linking group allowing the formation of crosslinks between unlike functional groups. Alternately, and preferably, the crosslinker or crosslinking group desirably is homobifunctional, i.e., having identical chemical reactivities on either end of the linking group. It also can be desirable according to the invention to employ a "zero-length" crosslinker, which is a reagent that forms a chemical bond between two groups without itself being incorporated into the resultant product (e.g., 1-ethyl-3-(3-demethylaminopropyl) carbodiimide hydrochloride (EDAC) and 2-ethoxy-1-ethoxycarbonyl-1,2-dihydroquinoline (EEDQ) used to couple carboxylic acids to amines). It further is possible according to the invention to employ as a crosslink a noncovalent interaction between two molecules that is of sufficient affinity to prevent the molecules from falling apart (e.g., biotinylation and haptenylation reagents, and the like). Crosslinkers and crosslinking agents can be obtained from a variety of commercial suppliers (e.g., Molecular Probes, Eugene, Oreg.; as well as a variety of others) and moreover, can be chemically synthesized using techniques known to those skilled in the art.

Preferred crosslinkers according to the invention include, but are not limited to trimethylolpropane trimethacrylate (TMPTMA), propyleneglycol triacrylate (PGTA), tripropyleneglycol diacrylate (TPGDA), allyl methacrylate (AMA), triethyleneglycol dimethacrylate (TEGDMA), tetrahydrofurfuryl methacrylate (TFMA) and TMPTA. Additionally, where it is preferred that the crosslinker itself forms part of the resultant polyacrylamide network structure, the present invention particularly contemplates use of a crosslinker that has more than two reactive groups, i.e., a multifunctional acrylate crosslinker, particularly a multifunctional crosslinker having between 2 to 5 functionalities (i.e., reactive groups). It especially is preferred according to the invention that the multifunctional crosslinker employed is pentaerythritol tetraacrylate (PETA), which has 4 functional groups and the structure identified in FIG. 4. Alternate multifunctional crosslinkers include, but are not limited to, pentaerythritol triacrylate (which has 3 functional groups), 1,5 pentane diol dimethacrylate (which has 2 functional groups), and pentaerythritol triallylether (which has 3 functional groups).

If so desired, crosslinkers or crosslinking groups employed in the invention can be lengthened with use of single or multiple linking groups, which preferably themselves are heterobifunctional. Such linking groups and their means of attachment are known in the art, and particularly, are described in PCT International Application WO 91/07087 (incorporated by reference, e.g., pages 13–14, Example O).

Moreover, it also is contemplated according to the invention that the crosslinker either can be added prior to or concurrent with crosslinking of the PRP, or has been synthesized so as to form an integral part of the PRP (or other prepolymer) itself. Such methods of synthesis are known to those skilled in the art, and also can be done on a contractual basis with commercial suppliers of polymers. Crosslinkers and the method of the their use in the present invention are further described below.

The invention sets forth various means by which the prepolymer and PRP can be obtained. Preferred fabrication routes according to the invention are described herein, including the Examples which follow, and, for instance, are set forth in FIG. 1. In particular, in the preferred method as set forth in FIG. 1, desirably the prepolymer is obtained by reaction of an acrylamide monomer and a co-monomer, for instance, to obtain polyacrylamide co-acrylic acid. The polyacrylamide co-acrylic acid or other co-monomer is then reacted with a crosslinking group, which optimally is followed by crosslinking (e.g., UV crosslinking).

As used herein a "copolymer" is the chain molecule formed by the simultaneous polymerization of two or more dissimilar monomers. A "co-monomer" is any second (or number greater than this) of monomeric entity employed in a copolymerization system. Especially preferred crosslinkers for inclusion in this reaction according to the invention are $CH_2CO_2CH=CHCH_3$, $CH_2CH_2OCH_2CH=CH_2$, and $H_2C=CHCO$, although other crosslinkers also can be employed. Such crosslinkers are commercially available (e.g., from Aldrich, Milwaukee, Wis.; PolySciences, Inc., Warrington, Pa.), and also can be synthesized using methods that are well known in the art (e.g., polymerizing different commercially available monomers). Desirably, the crosslinker is employed in the form of a salt, wherein the anionic species is any anion, particularly a halogen.

The polyacrylamide hydrogel product resulting from this polymerization/crosslinking reaction is set forth below as Structure II:

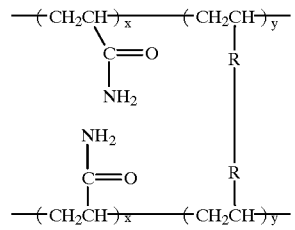

where x, y, and R are as described above.

The prepolymer product (or the PRP) obtained by these means either can be crosslinked with itself to obtain the acrylic polymer network structure (i.e., without incorporation into the resultant polyacrylamide hydrogel of the crosslinker), or can be crosslinked by way of a crosslinker, particularly a mutifunctional crosslinker as further described herein, to obtain an acrylic polymer network structure that incorporates the crosslinker (or a modification thereof, e.g., a crosslinking group) into the polymer structure.

Furthermore, it also is contemplated according to the invention that other acrylamide copolymers (i.e., derived with use of co-monomers other than acrylic acid, for instance, wherein R is a group such that the resultant co-monomer is acrylic acid, glycidyl methacrylate, N-(6-acryloylhexyl)-2,3,dimethylmaleimide, vinyl cinnamate, vinyl acetate, and others) can be used according to the invention, as long as the resulting gel is water-soluble. Examples of co-monomers are acrylic acid, vinyl acetate, vinyl alcohol, and other appropriate co-monomers also can be employed. It also is contemplated that small amounts of non-water soluble monomers are employed in the invention, so long as the resulting polyacrylamide hydrogel is water-soluble. Such co-monomers according to the invention desirably are functionalized with an appropriate reactive group (e.g., an acrylate such as, for instance, hydroxy ethyl acrylate or hydroxy propyl acrylate, ester or vinyl groups, glycidal methacrylate, and the like), rendering them capable of crosslinking. Such functionalization can be done either before or after the co-monomers are incorporated into the copolymer.

Thus, preferably a prepolymer is a polymerized form of acrylamide, and particularly, desirably a prepolymer is a copolymer of acrylamide that is obtained by copolymerization with a co-monomer (particularly a functionalized co-monomer) including, but not limited to, acrylic acid, vinyl acetate, vinyl alcohol, and glycidal methacrylate.

Alternately, in another preferred embodiment, a homopolymer of a hydrophillic polymer such as poly vinyl alcohol, polyacrylamide, and polyacrylic acid desirably is modified with a functional group such as cinnamic acid chloride, dimethylmaleimidyl acid chloride, or acryloyl chloride to obtain a reactive prepolymer that can be crosslinked by UV irradiation.

It is contemplated according to the invention that, in a simplest preferred embodiment, linear polyacrylamide can be obtained (e.g., with amine groups functioning as the crosslinking groups). A polyacrylamide hydrogel having a high porosity is obtained using this route.

In another preferred embodiment, desirably co-monomer is added with acrylamide to form an acrylic copolymer. This then subsequently is functionalized with a reactive group, i.e., a crosslinking group, or the co-monomer optimally can be functionalized prior to copolymerization.

In yet another preferred embodiment the two polymers are linked together through a crosslink group, e.g., as exhibited in Structure II.

Figure 4:
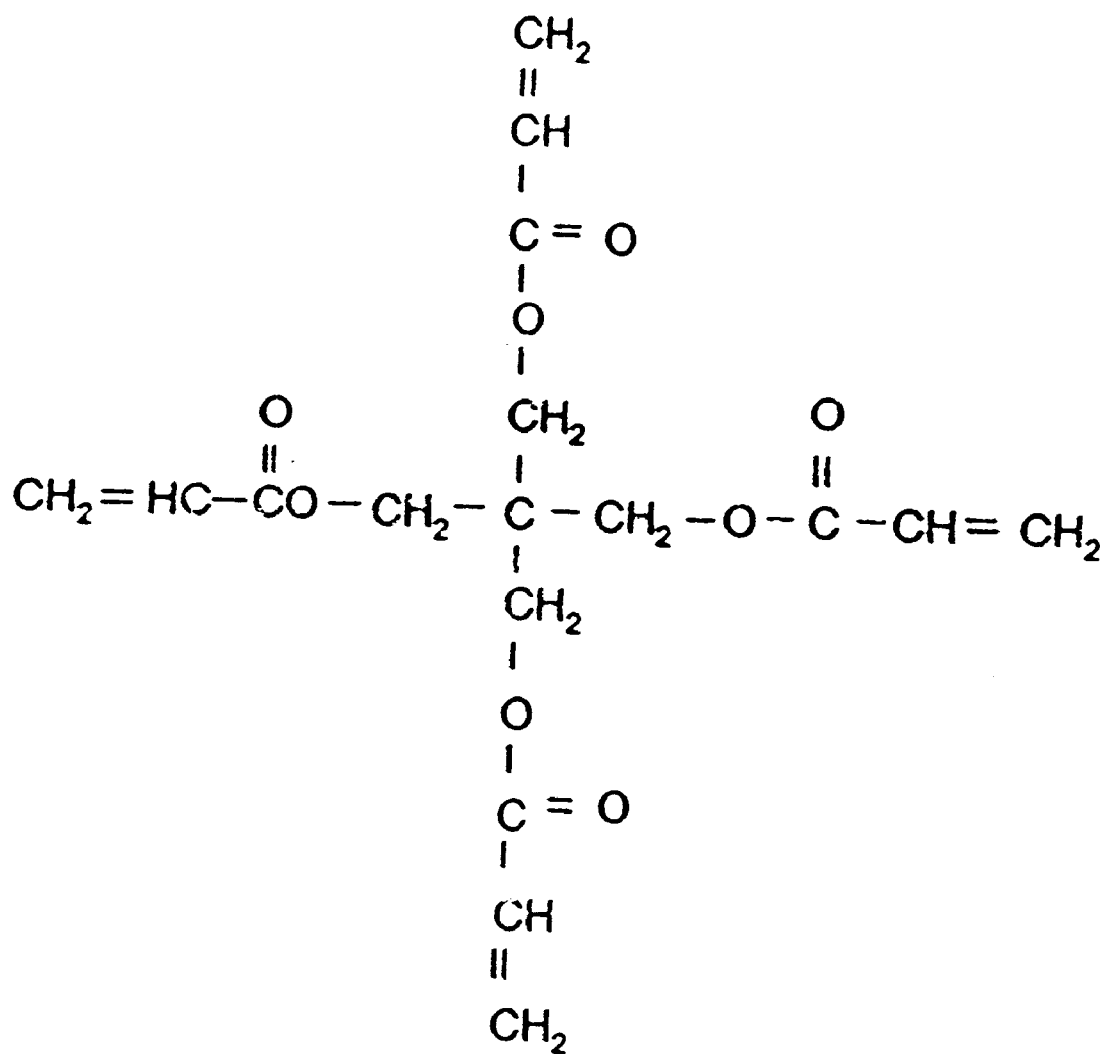
FIG. 4 is the chemical structure of the multifunctional acrylate crosslinker pentaerythritol tetraacrylate (PETA).
Figure 5:
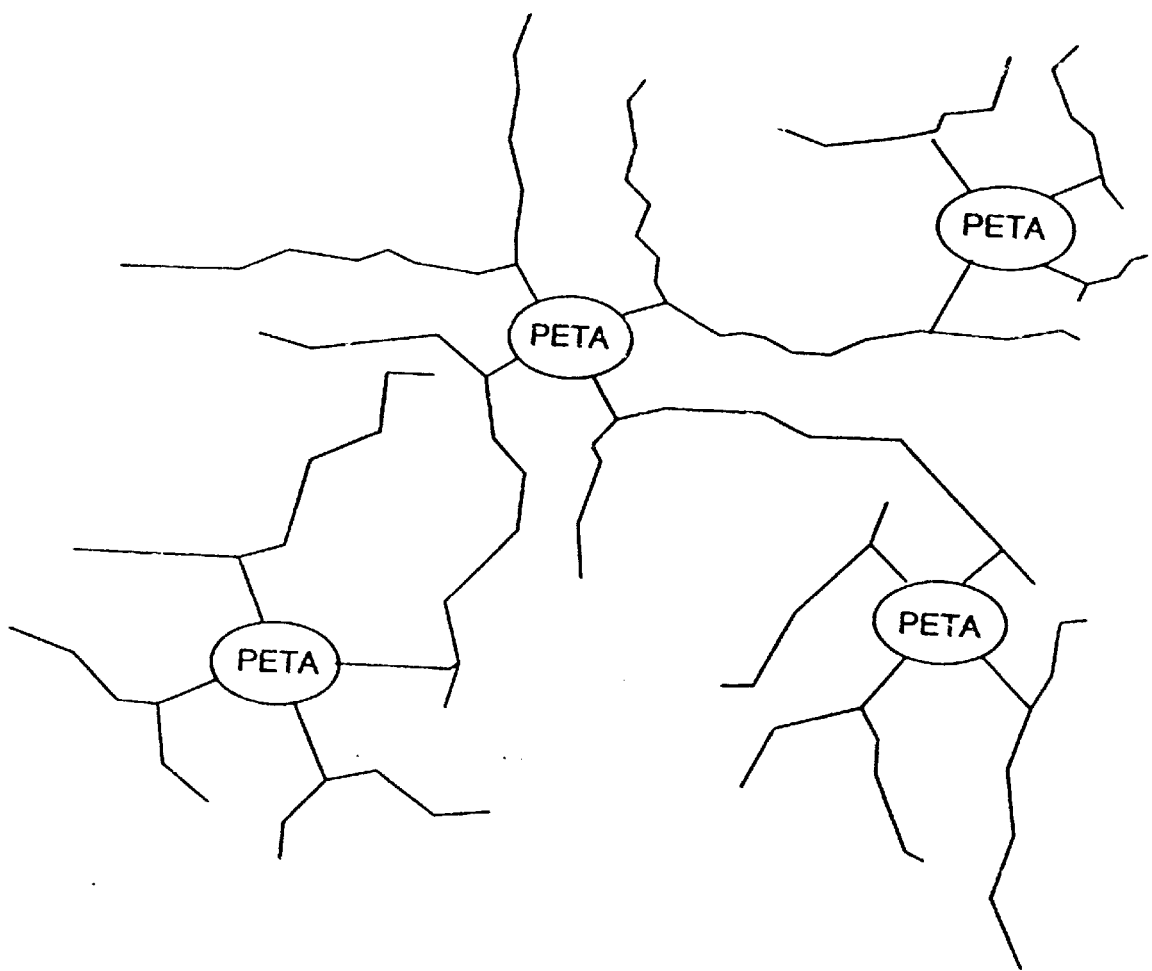
FIG. 5 is a diagrammatic representation of the high local concentration of branch points obtained with use of a multifunctional acrylate crosslinker such as PETA.
Figure 6:
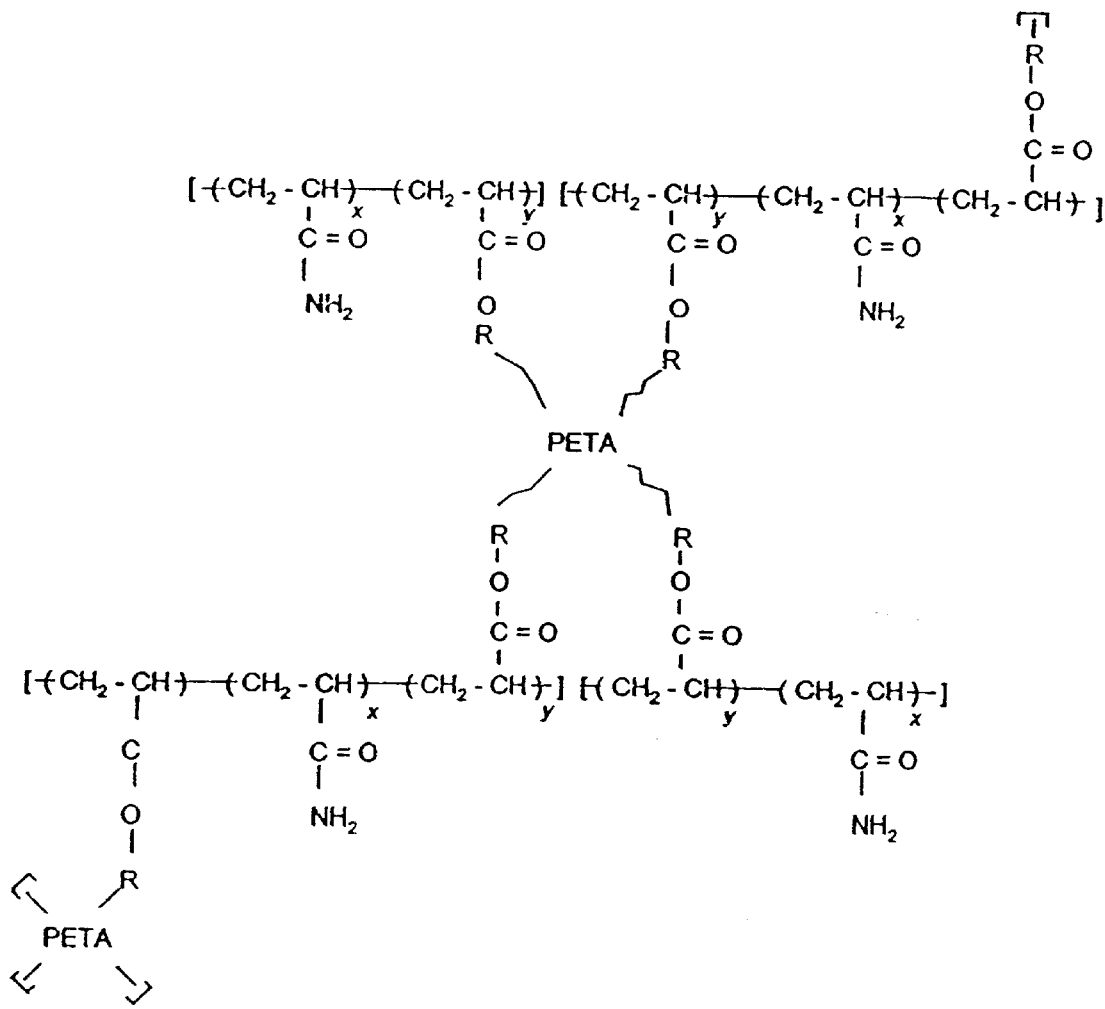
FIG. 6 depicts the crosslinked polyacrylamide hydrogel that is obtained when PETA is employed to crosslink the PRP set out in FIG. 1; PETA could be used as well to crosslink the polymers shown in FIGS. 2 and 3.

In yet another preferred embodiment, preferably two polymers are linked together with crosslinker, especially a multifunctional crosslinker, e.g., as Exhibited in FIGS. 4–6.

In still another preferred embodiment, desirably a co-monomer including crosslinking groups is copolymerized with acrylamide, and then reacted with a multifunctional crosslinker such as PETA, e.g., as Exhibited in FIGS. 4–6. The crosslinking groups present in the copolymer interact with the multifunctional crosslinker as well as like crosslinking groups. Of course further embodiments are contemplated according to the invention by variation of the various elements of the invention such as would be known in the art.

According to the invention, acrylamide monomer and acrylamide polymers (and acrylic crosslinkers) can be employed for reaction either in their acid form (e.g., acrylic acid), or as a salt of the acid.

In initiating the polymerization/crosslinking reaction according to the invention, in particular, it is preferred that photoinitiators be employed, although other initiators known to those skilled in the art (e.g., thermal initiators) also can be employed. With use of highly reactive crosslinking groups in the invention, it is possible that reactions will be self-initiating, rendering the addition of exogenous initiators unnecessary. Desirably any such initiators which are employed are water-soluble. A "photoinitiator" is an agent that functions typically by either free radical initiation or cationic initiation—i.e., absorption of UV radiation followed by subsequent reaction to give a radical initiator or cation which induces the polymerization/crosslinking reaction). Preferred photoinitiators include, but are not limited to: benzophenones, xanthones, and quinones (each of which typically require an amine co-synergist); benzoin ethers, acetophenones, benzoyl oximes, and acylphosphines (each of which typically do not require a co-initiator such as an aliphatic amine); as well as other known photoinitiators. While not strictly necessary according to the invention, TEMED (N,N,N',N'-tetramethylethylendiamine) can be employed as an initiator. In particular, preferably according to the invention an amount by weight of initiator (e.g., photoinitiator or other initiator) ranging from about 0.01% to about 2%, particularly about 0.05%, is present in the polymerization reaction that also comprises PRP, and perhaps added crosslinker.

Certain of the photoinitiators (e.g., benzophenones) also can be employed as photosensitizers. Whereas a photoinitiator can be used without a photosensitizer, a photosensitizer generally will be employed in the methods of the invention only along with use of a photoinitiator. A "photosensitizer" is an agent that is used primarily to extend the spectral range of the reaction, i.e., to make a particular reaction more efficient at a different wavelength. Photosensitizers that can be employed according to the invention include benzophenones, 2,3-butanedione, acetophenone, anthroquinone, Michler's Ketone, p-dimethylaminonitrobenzene substituted thioxanthones, methylene blue, as well as other photosensitizing agents and modified derivatives thereof, particularly salts, and especially anthroquinone 2-sulfonic acid sodium salt. Desirably such agents are water-soluble.

The methods provided herein for controlled polymerization/crosslinking, are advantageous in that they allow increased control of crosslinking density, and furthermore, provide a more uniform pore size in the resultant polyacrylamide hydrogel (as well as hydrogel array). The present invention contemplates polyacrylamide hydrogels having pore sizes of greater than 0.01 microns, and in particular, contemplates polyacrylamide hydrogels having pore sizes of from about 0.001 microns to 1.0 microns. On the low end of this scale about 0.001 microns includes a porosity that is too small to be measured by standard means, i.e., a gel that is "fully dense". For applications involving larger size polynucleotides (e.g., DNA) a pore size of 0.1 to about 1.0 microns is desirable. The pore size can be determined and/or confirmed by gel electrophoresis or scanning electron microscopy. Accordingly, among other things, the present invention provides for the first time a larger pore size, for instance, a pore size appropriate for detection of larger nucleic acid species present in a polyacrylamide hydrogel for use in commercial processes.

Namely, methods that predate the present invention provide for pore sizes of up to about 0.5 microns. However, these methods rely on older technology (e.g., use of high concentrations of methylene bisacrylamide for polymerization/crosslinking, inclusion in gels of stabilizers). The resultant are opaque, or possess regions of opacity, which render these gels unusable for commercial processes (e.g., involving visualization of gels). Also, the use of methylene bisacrylamide concentrations of from about 30% to 60% to obtain the larger pore sizes results in hydrogels which are more hydrophobic and not the appropriate consistency (i.e., the hydrogels tend to fall apart), thus precluding their use in commercial applications. These gels additionally are quite difficult to prepare, having large "nodules" that fall out of the solution. By comparison, the polyacrylamide hydrogels and hydrogel pad arrays obtained according to the present invention desirably comprise a wide range of pore sizes, particularly pore sizes appropriate for use with DNA (i.e., pore sizes of from about 0.01 microns to about 1.0 microns, particularly from about 0.1 microns to about 1.0 microns, and especially from about 0.4 microns to about 1.0 microns). Optimally according to the invention, the resultant polyacrylamide hydrogel is transparent (i.e., is nonopaque) in the UV visible range of the spectrum. Furthermore, preferably the hydrogel has good structural features (i.e., does not tend to fall apart and/or exhibits greater structural stability or less of a tendency to fall apart as compared to polyacrylamide gels having the same pore size but prepared using methods that predate the present invention.

The pore size of the polyacrylamide resulting from the present invention can be modified by changing the nature of and/or amount of crosslinker applied. In particular, the degree of crosslinking can be controlled by adding multifunctional crosslinker such as PETA. This will give a higher degree of branching and larger pore size.

These advantages of the present invention are due to the manner in which polymerization is controlled according to the invention, as well as the fact that the multifunctional crosslinker yields a higher local concentration of branch points. A diagrammatic representation of the high local concentration of branch points obtained with use of a multifunctional acrylate crosslinker such as PETA is set out in FIG. 5. Upon crosslinking a PRP as previously described, particularly a PRP having the structure exhibited by Structure II, with the crosslinker PETA, a crosslinked polyacrylamide having the structure identified in FIG. 6 (or a similar structure) is obtained.

The present invention thus provides a polyacrylamide hydrogel (or polyacrylamide hydrogel array) that has a more uniform crosslink density. By way of illustration, and not limitation, it is contemplated, for instance, that with use according to the invention of a prepolymer having a molecular weight of about 6,000 g/mole, the resultant polyacrylamide hydrogel will contain 2 crosslink points per polymer chain. Similarly, with use of a prepolymer having a molecular weight of about 30,000 g/mole, it is anticipated that the resultant polyacrylamide hydrogel will contain about 10 crosslink points per polymer chain. Also, with use of a prepolymer having a molecular weight of about 300,000 g/mole, it is expected that the resultant polyacrylamide hydrogel will contain about 100 crosslink points per polymer chain. In particular, preferably according to the invention, the polyacrylamide hydrogel or hydrogel array uniformly contains 1 crosslink or branch point per every 40 repeat units, desirably per every 15 units. Of course, it is anticipated that with use of multifunctional crosslinkers such as PETA, a greater number of crosslink points per polymer chain will be obtained.

A further important feature of the polyacrylamide hydrogel produced according to the invention is that it is obtained by a photosensitive process. This preferably is accomplished with use of a PRP that also is a photopolymer. By "photopolymer" is meant the fact that a PRP (and potentially also a prepolymer) is "photoreactive", i.e., undergoes crosslinking when exposed to UV illumination. Generally, a photopolymer according to the invention is obtained by incorporation into the prepolymer or PRP of photoreactive crosslinker. Alternatively, a photoreactive crosslinker can be added to the polymerization process either instead of (i.e., the reactive prepolymer employed for polymerization does not include photoreactive groups), or in addition to, the use of a prepolymer that incorporates photoreactive groups. Any photoreactive crosslinker or crosslinking group can be employed according to the invention. Optimally, however, these agents will contain a chemically reactive group as well as a photoreactive group. This will allow the photoreactive crosslinker or crosslinking group to be first chemically reacted with one molecule, for instance, a reactive prepolymer, a copolymer, or PRP. Then this modified molecule can be coupled to a second molecule, for instance, a prepolymer, a copolymer, or PRP, using UV illumination. Examples of such photoreactive agents include benzophenone derivatives that exhibit excitation at greater than 360 nm of UV illumination. Typically, many (if not all) of the crosslinkers previously described are photoreactive.

The actual manner in which acrylamide monomer is physically prepolymerized to obtain the prepolymer, or PRP, is not critical to the practice of this invention. Polymerization can be initiated by chemicals, irradiation, or any other techniques known to those skilled in the art, or any combination of techniques. Preferably, however, initiation of polymerization will be by UV irradiation or thermal initiation. Similarly, desirably crosslinking will involve either UV irradiation or thermal initiation. Such techniques are well known in the art and can be done using well described protocols that have been optimized for use with a particular initiator. Thus, polymerization/crosslinking of the prepolymer or PRP can be carried out by a variety of means. Generally, photopolymerization/crosslinking is done by placing the reaction composition under a UV light source, e.g., a UV transilluminator. In terms of UV exposure, photopolymerization/crosslinking desirably can be carried out at any wavelength having sufficient energy to produce a crosslink in the particular polymerization reaction being employed. Of course, the inclusion in such a polymerization reaction of a photosensitizer increases the useful range of wavelengths according to the invention. Similarly, thermal polymerization/crosslinking can be done with use of a temperature-controlled chamber, e.g., glass chamber or oven.

Photopolymerization/crosslinking optionally is carried out at any wavelength. Generally, photopolymerization/ crosslinking is carried out in the range between about 250 nm and 450 nm, and even more preferably, is carried out at about 365 nm. A UV exposure carried out according to the invention can last anywhere from about about 0.5 seconds to about 30 minutes. Preferably, exposure is from about 1 second to about 4 minutes, and even more desirably, from about 2 seconds to about 2 minutes. This represents a substantial improvement over prior approaches to photopolymerization/photocrosslinking, where longer irradiation times at a shorter wavelength (i.e., greater biohazard) are needed.

In terms of actual UV energy supplied for photopolymerization/crosslinking, this further can provide an assessment of the UV reactivity of the particular crosslinker used. Preferably according to the invention, the crosslinking group employed is one which is very reactive, e.g., in a free radical crosslinking reaction. Reactivity can be assessed, if so desired, by a variety of means, including, in particular, by the amount of exposure energy needed to be supplied to effect the crosslinking reaction. Typically according to the invention, exposure energies of less than about 10,000 milliJoules/cm$^2$ are preferred, with exposure energies of from about 100 to about 6,000 milliJoules/cm$^2$ being even more desirable, and exposure energies less than about 500 milliJoules/cm$^2$ being optimal.

With creation of polyacrylamide hydrogel arrays, preferably photoactivation/crosslinking of the polyacrylamide is through use of a patterned mask, e.g., "mask-directed photopolymerization" or "imaging", where imaging means merely to expose to light in a pattern, and to obtain a product in that light pattern (see, e.g., U.S. Pat. Nos. 5,552,270 and 5,770,721 and PCT International Applications WO 95/04834 and 92/16655, all incorporated by reference). The mask has a desired resolution and shape allowing for formation of the array. Photopolymerization/crosslinking does not occur in places that are covered by the nontransparent mask (see, e.g., Sze, *VLSI Technology,* McGraw-Hill (1983), incorporated by reference). Alignment of the mask can be performed using alignment techniques known in the art, including but not limited to, interferometric techniques (see, e.g., Flanders et al., *App. Phys. Lett.,* 31, 426–428 (1977), incorporated by reference). Alternately, the patterned array can be formed without use of a mask, e.g., by using a laser beam forming a pattern of a laser irradiated region, by using a directed UV light source forming a pattern of UV irradiated regions, as well as other means known in the art (e.g., U.S. Pat. No. 4,719,615, incorporated by reference), such that a patterned array network of the desired resolution and shape is formed.

Once the polyacrylamide hydrogels have been polymerized and crosslinked, and are adherent to the glass, modification of the polyacrylamide ("functionalization" or "activation") can be done so as to ensure the reactivity of the polyacrylamide with various moieties such as oligonucleotides, peptides, etc. Such modification, while not required according to the invention, can be done by any appropriate means such as is known in the art. A preferred treatment is any treatment that introduces primary amino groups or aldehydes into the acrylamide (e.g., treatment with hydrazine or ethylene diamine).

The following examples further illustrate the present invention but, of course, should not be construed as in any way limiting its scope.

EXAMPLE 1

Polyacrylamide Gel Preparation With Use of a PRP

This example describes preferred methods according to the invention for polyacrylamide gel preparation and incorporation into a polyacrylamide hydrogel array with use of a polyacrylamide reactive prepolymer.

All solvents employed preferably are analytical or HPLC grade. General reagents can be purchased from a variety of commercial suppliers (e.g., Fluka, Aldrich, and Sigma Chemical Co.). Glass slides can be obtained from commercial suppliers (e.g., Corning Glass Works).

A solution can be prepared of acrylamide and reactive co-monomer acrylic acid (from about 3% to about 50%) and then modified with acryloyl chloride (e.g., RZ in FIG. 1) to obtain a polyacrylamide reactive prepolymer (PRP), as set out in the reaction scheme in FIG. 1 (as well as being exemplified by Structure I). As can be seen in FIG. 1, this is followed by UV crosslinking. UV crosslinking can be done using a photoreactive crosslinker to mediate or facilitate crosslinking of the PRP to a glass (or other) surface, e.g., a crosslinker that forms part of the resultant polyacrylamide hydrogel network. UV crosslinking of a standard coating thickness of 5 $\mu$m followed by imaging and developing operations can be employed to obtain crosslinked polyacrylamide, including crosslinked polyacrylamide hydrogel arrays. These manipulations, as well as further illustrative embodiments thereof, are set out in the further following examples.

Photocrosslinking with Added Crosslinker and Offset Printing to Form Pattern

A 5% solids solution (range of from about 2% to about 25% solids) of polyacrylamide reactive prepolymer containing 1% by weight pentaerythritol tetraacrylate and 1% by weight anthroquinone 2-sulfonic acid sodium salt is coated in a grid array pattern (pad size from about 50 $\mu$m to about 500 $\mu$m) by offset printing on a solid support to a wet thickness of 25 $\mu$m (range of from about 1 $\mu$m to about 50 $\mu$m). The patterned coating is then exposed with UV radiation to convert the polyacrylamide by photochemical reaction from a soluble material to an insoluble material leaving a array pattern of crosslinked, hydrogel material. The solid support optionally can then be diced into individual biochips each containing from about 500 to about 100,000 hydrogel pads.

Thermal Initiation with Added Crosslinker and Offset Printing to form Pattern

A 5% solids solution (range of from about 2% to about 25% solids) of polyacrylamide reactive prepolymer containing 1% by weight pentaerythritol tetraacrylate and 1% by weight anthroquinone 2-sulfonic acid sodium salt is coated in a grid array pattern (pad size from about 50 $\mu$m to about 500 $\mu$m) by offset printing on a solid support to a wet thickness of 25 $\mu$m (range from about 1 $\mu$m to about 50 $\mu$m). The patterned coating is then held in a chamber at room temperature for up to about 2 hours until crosslinking is complete resulting in a array pattern of crosslinked, hydrogel material. The solid support optionally can then be diced into individual biochips each containing from about 500 to about 100,000 hydrogel pads.

This example thus confirms that a polyacrylamide hydrogel and/or hydrogel array advantageously can be prepared with use of a polyacrylamide reactive prepolymer. Desirably this method is employed in an industrial setting for manufacturing scale-up.

EXAMPLE 2

Method For Synthesis of a 20:1 DMI Photopolymer

Figure 2:
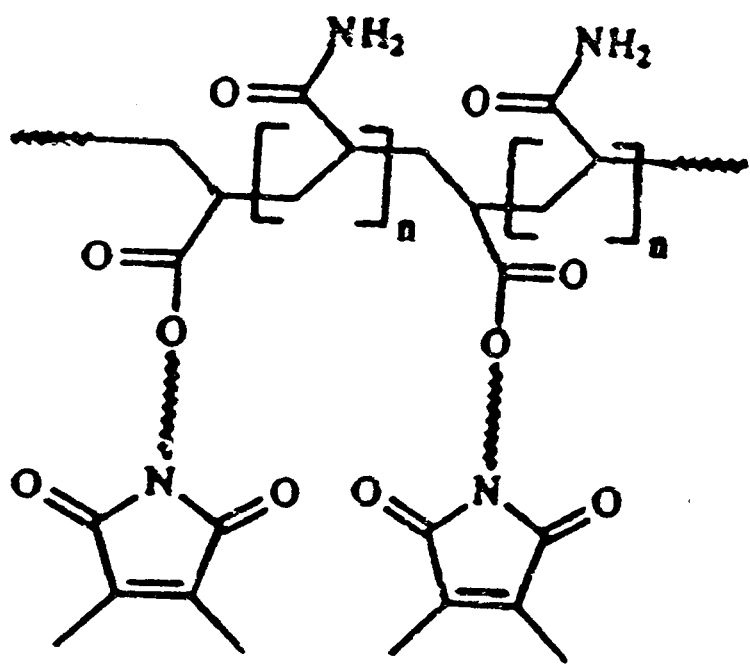
FIG. 2 depicts a preferred photopolymer according to the invention that contains a dimethylmaleimide reactive group. Symbols: n, 10, 15, or 20.

This Example describes a method for synthesis of a 20:1 DMI photopolymer (e.g., as depicted in FIG. 2). Namely, this polymer is a copolymer of acrylamide where N-(6-acryloylhexyl)-2,3-dimethyl-maleimide is a co-monomer with acrylamide, i.e., the photopolymer is polyacrylamide co-N-(6-acryloylhexyl)-2,3-dimethyl-maleimide.

For these studies, 17.06 gram (0.24 Mol) of acrylamide (Fluka BioChemica, grade appropriate for electrophoresis), 3.35 gram (0.012 Mol) of N -(6-acryloylhexyl) -2,3-dimethyl-maleimide, 0.39 gram (0.00156 Mol) of copper(II) sulfate pentahydrate, and 0.3 gram (0.00111 Mol) of potassium peroxodisulfate were dissolved in 81.6 gram of n-propanol/water 2:1 in a 250 ml-3-neck flask equipped with a condenser, a stirrer, and a gas inlet/outlet. The solution was deoxygenated with argon gas for 15 minutes, and then heated up to 65° C. and stirred at this temperature for 4 hours. After cooling down to room temperature, the salts were removed from the solution by filtration over a column filled with ion exchange resin (Dowex Monosphere 450). The coating solution was obtained after adding 0.5 gram anthraquinone 2-sulfonic acid sodium salt to 49.5 gram of the above prepared acrylamide solution. The solid content of this solution was 19.9%.

EXAMPLE 3

Method For Synthesis of a 15:1 Acrylate Photopolymer

Figure 3:
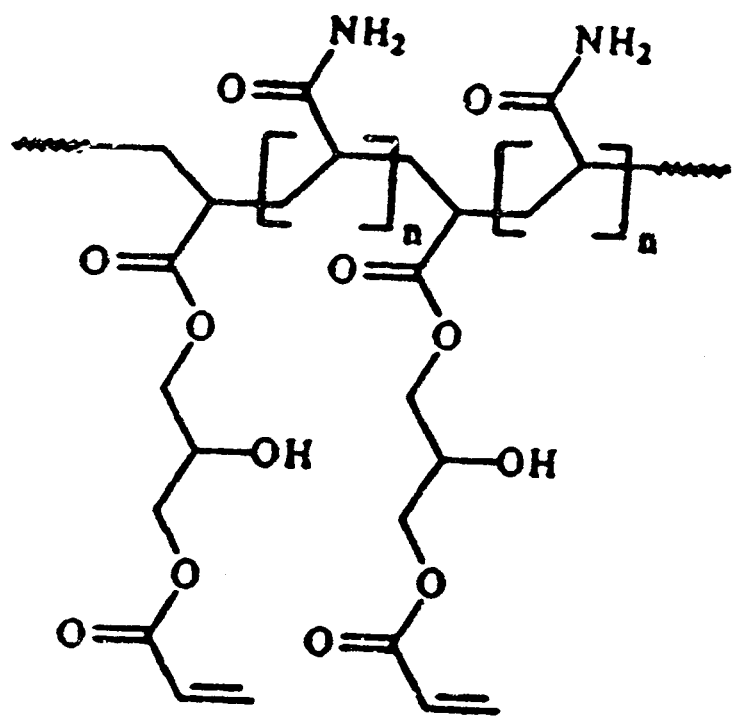
FIG. 3 depicts a preferred photopolymer according to the invention that contains an acrylate reactive group. Symbols: n, 10, 15, or 20.

This Example describes a method for synthesis of a 15:1 acrylate photopolymer (e.g., as depicted in FIG. 3). Namely, this polymer is a copolymer of acrylamide where glycidyl methacrylate is a co-monomer with acrylamide, i.e., the polymer is polyacrylamide co-glycidyl methacrylate. This copolymer is further modified with acrylic acid to produce the photosensitive polyacrylamide reactive prepolymer.

For these studies, 15.99 gram (0.225 Mol) of acrylamide (Fluka BioChemica, grade appropriate for electrophoresis), 2.13 gram (0.015 Mol) of glycidyl methacrylate, 0.39 gram (0.00156 Mol) of copper(II)sulfate pentahydrate, and 0.3 gram (0.00111 Mol) of potassium peroxodisulfate were dissolved in 82.5 gram of n-propanole/water 2:1 in a 250 ml-3-neck flask equipped with a condenser, a stirrer, and a gas inlet/outlet. The solution was deoxygenated with argon gas for 15 minutes, and then was heated up to 65° C. and stirred at this temperature for 4 hours. After cooling down to room temperature, the salts were removed from the solution by filtration over a column filled with ion exchange resin (Dowex Monosphere 450). 45 gram of the above prepared solution and 0.47 gram (0.0065 Mol) of acrylic acid was placed in a 100 ml flask equipped with a condenser and was stirred (magnetic stirrer bar) for 20 hours at 90° with external heating. The coating solution was obtained after adding 0.45 gram anthraquinone 2-sulfonic acid sodium salt and 0.25 gram triethanol amine to the acrylated acrylamide solution. The solid content of this solution was 23.8%.

EXAMPLE 4

Photocrosslinking with no Added Crosslinker

This Example describes photocrosslinking carried out with the polyacrylamide reactive prepolymer of Example 2.

A 20% solids solution (range of from about 2% to about 40% solids) of polyacrylamide reactive prepolymer and 1% by weight anthroquinone 2-sulfonic acid sodium salt is coated on a solid support to a wet thickness of about 25 $\mu$m (range of from about 1 $\mu$m to about 50 $\mu$m). The coating is then exposed with UV radiation (less than about 1,000 milliJoules/cm$^2$) through a photomask containing a grid array pattern of pads (pad size of from about 1 $\mu$m to about 500 $\mu$m) to convert the polyacrylamide by photochemical reaction from a soluble material to an insoluble, crosslinked, hydrogel material. The unexposed and still soluble material is then selectively removed by an aqueous developer solution leaving an array pattern of the crosslinked, porous, hydrogel. The solid support can then optionally be diced into individual biochips each containing from about 500 to about 100,000 pads.

EXAMPLE 5

Photocrosslinking with Added Multifunctional Crosslinker

This Example describes photocrosslinking carried out with the polyacrylamide reactive prepolymer of Example 2.

A 20% solids solution (range of from 2% to about 40% solids) of polyacrylamide reactive prepolymer containing 1% by weight pentaerythritol tetraacrylate (range of from about 0.05% to 1.5%) and 0.05% by weight anthroquinone 2-sulfonic acid sodium salt is coated on a solid support to a wet thickness of 25 $\mu$m (range of from about 1 $\mu$m to about 50 $\mu$m). The coating is then exposed with UV radiation through a photomask containing a grid array pattern of pads (pad size of from about 1 $\mu$m of from 500 $\mu$m) to convert the polyacrylamide by photochemical reaction from a soluble material to an insoluble, crosslinked, hydrogel material. The unexposed and still soluble material is then selectively removed by an aqueous developer solution leaving an array pattern of the crosslinked, porous, hydrogel. The solid support optionally can then be diced into individual biochips each containing from about 500 to about 100,000 hydrogel pads.

EXAMPLE 6

Improved Properties and Procedures With Use of Controlled Methods

This example describes some of the advantages that accompany use of the controlled polymerization reactions (as set out in the preceding) in preparation of polyacrylamide hydrogels and hydrogel arrays.

A few of the advantages include:

1. The prepolymer has high viscosity so that the film thickness can be maintained without the use of spacers and a top glass. This means that the coating process is easily transferable to commercial coating equipment.
2. Since the material is prepolymerized, UV energy is needed only to crosslink, such that reaction times can be reduced to from about 1 to about 2 minutes, thus making the imaging compatible with standard exposure equipment such as a mask aligner or photoprinter. Furthermore, the method allows conventional imaging (365 or 420 nm) and development to be carried out.
3. The polyacrylamide prepolymer is non-toxic due to its higher molecular weight. This greatly reduces the expense of handling hazardous material and waste disposal.
4. The prepolymer can be imaged and patterned to high resolution by UV crosslinking similar to a negative acting photoresist. This patternability increases the applicability of the gel as a binding layer for biological molecules.
5. The prepolymer is synthesized under controlled conditions resulting in a more uniform and reproducible molecular weight distribution. The higher uniformity in the starting material yields more uniform and more reproducible poor size and crosslink density in the gel.
6. No stabilizer needs to be added to the polymerization mixture, and crystallization of this mixture typically will not occur.

This example thus confirms that the use of the methods of the invention to prepare polyacrylamide hydrogels/hydrogel arrays simplifies processibility, improves gel uniformity, and reduces toxicity. The obtained polyacrylamide hydrogel or hydrogel array can be used in any application in which a polyacrylamide hydrogel or hydrogel array prepared by any other means would be employed. For instance, the product according to this invention can be employed in medicine, molecular biology, veterinary and forensics applications, and agriculture, to name but a few, for the purpose of genetic diagnosis, DNA sequencing and mapping, mutation detection, and any other desired application. Representative means by which polyacrylamide hydrogel arrays can be prepared, functionalized and/or employed are described, for instance, in U.S. Pat. Nos. 5,770,721, 5,741,700, 5,756,050, 5,552,270 and PCT International Applications WO 98/28444, WO 98/27229, WO 97/27329, WO 95/04834, WO 95/04833, WO 95/04594, WO 92/16655, which are hereby incorporated in their entireties by reference.

All of the references cited herein are hereby incorporated in their entireties by reference.

While this invention has been described with an emphasis upon a preferred embodiment, it will be obvious to those of ordinary skill in the art that variations in the preferred composition and method may be used and that it is intended that the invention may be practiced otherwise than as specifically described herein. Accordingly, this invention includes all modifications encompassed within the spirit and scope of the invention as defined by the following claims.

What is claimed is:

1. A method of preparing a polyacrylamide hydrogel comprising:
   (a) providing a liquid solution comprising a polyacrylamide reactive prepolymer, wherein the polyacrylamide reactive prepolymer comprises a copolymer of acrylamide and one or more compounds selected from the group consisting of N-(6-acryloylhexyl)-2,3-dimethylmaleimide, vinyl cinnamate, and acrylic acid, wherein the acrylic acid is functionalized with a compound selected from the group consisting of glycidyl methacrylate, hydroxy ethyl acrylate, and hydroxy propyl acrylate;
   (b) placing a liquid solution of said polyacrylamide reactive prepolymer on a solid support; and
   (c) photochemically crosslinking said polyacrylamide reactive prepolymer to obtain said polyacrylamide hydrogel.

2. The method of claim 1 wherein said polyacrylamide reactive prepolymer solution has a viscosity of from 25 to 500,000 centiPoise.

3. The method of claim 1 wherein said polyacrylamide reactive prepolymer has a gel pore size of from about 0.001 to about 1.0 microns.

4. The method of claim 1, wherein photochemical crosslinking is done by means of a reactive group present in said polyacrylamide reactive prepolymer.

5. The method of claim 1, wherein said polyacrylamide reactive prepolymer has a molecular weight of about 1,000 to about 300,000 g/mole.

6. The method of claim 1, wherein said polyacrylamide reactive prepolymer has a molecular weight of about 1,000 to about 100,000 g/mole.

7. The method of claim 1, wherein said polyacrylamide reactive prepolymer has a molecular weight of about 1,000 to about 5,000 to about 50,000 g/mole.

8. The method of claim 1, wherein said polyacrylamide hydrogel contains about 1 cross-link or branch point per every 15 units.

9. The method of claim 1, wherein said polyacrylamide hydrogel transparent to ultraviolet light.

10. The method of claim 1, wherein said polyacrylamide reactive prepolymer comprises a copolymer of acrylamide and N-(6-acryloylhexyl)-2,3-dimethyl-maleimide.

11. The method of claim 1, wherein said polyacrylamide reactive prepolymer comprises poly(acrylamide-co-acrylic acid), wherein the —OH substituent of the acrylic acid is functionalized with glycidyl methacrylate, hydroxy ethyl acrylate, or hydroxy propyl acrylate.

12. The method of claim 1, wherein said polyacrylamide reactive prepolymer is a copolymer of acrylamide and vinyl cinnamate.

13. The method of claim 1, wherein said polyacrylamide reactive prepolymer comprises a copolymer of acrylamide and glycidyl methacrylate, wherein said copolymer is further functionalized with acrylic acid.

14. The method of claim 1, wherein said polyacrylamide reactive prepolymer has the structure.

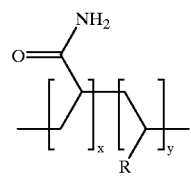

wherein
   x is an integer from 1 to 100;
   y is an integer from 1 to 100; and
   R comprises a vinyl containing reactive group, wherein said reactive group is capable of undergoing photochemical crosslinking.

15. The method of claim 14, wherein x is between 70 and 40 and y is between 30 and 1.

16. The method of claim 14, wherein x is about 15 and y is about 1.

17. The method of claim 1 wherein the prepolymer is placed on the solid support by roller coating, curtain coating, extrusion coating, offset printing, spin coating or manually coating.

18. In a method of making a polyacrylamide hydrogel or hydrogel array, the improvement comprising:
   forming a polyacrylamide reactive prepolymer, wherein the polyacrylamide reactive prepolymer comprises a copolymer of acrylamide and one or more compounds selected from the group consisting of N-(6-acryloylhexyl)-2,3-dimethylmaleimide, vinyl cinnamate, and acrylic acid, wherein the acrylic acid is functionalized with a compound selected from the group consisting of glycidyl methacrylate, hydroxy ethyl acrylate, and hydroxy propyl acrylate; and
   photochemically crosslinking said polyacrylamide reactive prepolymer to obtain said polyacrylamide hydrogel or hydrogel array.

19. The method of claim 18, wherein said polyacrylamide reactive prepolymer comprises a copolymer of acrylamide and glycidyl methacrylate, wherein said copolymer is further functionalized with acrylic acid.

20. A method of preparing a polyacrylamide hydrogel array comprising:
   (a) providing a liquid solution comprising a polyacrylamide reactive prepolymer, wherein the polyacrylamide reactive prepolymer comprises a copolymer of acrylamide and one or more compounds selected from the group consisting of N-(6-acryloylhexyl)-2,3-dimethylmaleimide, vinyl cinnamate, and acrylic acid, wherein the acrylic acid is functionalized with a compound selected from the group consisting of glycidyl methacrylate, hydroxy ethyl acrylate, and hydroxy propyl acrylate;
   (b) placing said polyacrylamide reactive prepolymer on a solid support; and
   (c) making a polyacrylamide hydrogel array having a pattern therein by photochemically crosslinking the polyacrylamide reactive prepolymer at locations on the solid support comprising said pattern.

21. The method of claim 7, which further comprises removing polyacrylamide reactive prepolymer that has not crosslinked using an aqueous solution.

22. The method of claim 20, wherein said crosslinking is performed by exposing said polyacrylamide reactive prepolymer to ultraviolet light.

23. The method of claim 20, wherein said crosslinking is done by:
   (a) placing a mask in proximity to the surface of the polyacrylamide reactive prepolymer solution on the solid support, wherein the mask comprises opaque and translucent portions and wherein the translucent portions of the mask comprise said pattern, and
   (b) exposing said polyacrylamide reactive prepolymer to ultraviolet light through the translucent portions of the mask to obtain said pattern.

24. The method of claim 20, wherein said crosslinking is done by:
   using a laser beam to crosslink sections of said polyacrylamide reactive prepolymer in a pattern.

25. The method according to claim 20 wherein crosslinking is accomplished by irradiating the polyacrylamide reactive prepolymer with a laser beam.

26. The method of claim 20, wherein said polyacrylamide reactive prepolymer comprises a copolymer of acrylamide and glycidyl methacrylate, wherein said copolymer is further functionalized with acrylic acid.

27. A polyacrylamide reactive prepolymer comprising: a copolymer of acrylamide and one or more compounds selected from the group consisting of N-(6-acryloylhexyl)-2,3-dimethylmaleimide, vinyl cinnamate, and acrylic acid, wherein the acrylic acid is functionalized with a compound selected from the group consisting of glycidyl methacrylate, hydroxy ethyl acrylate, and hydroxy propyl acrylate.

28. The polyacrylamide reactive prepolymer of claim 27, wherein said copolymer if formed by thermal polymerization.

29. The polyacrylamide reactive prepolymer of claim 27 having the structure.

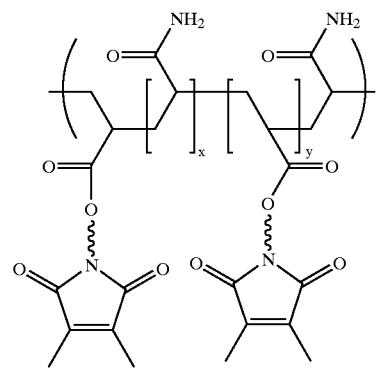

30. The polyacrylamide reactive prepolymer of claim 27 having the structure.

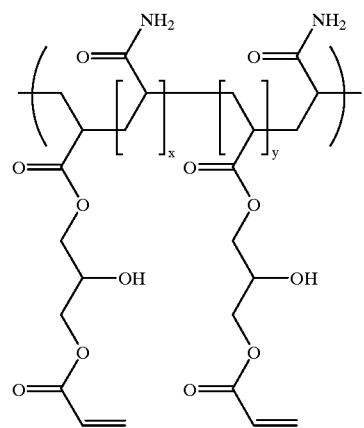

31. The polyacrylamide reactive prepolymer of claim 27, wherein said polyacrylamide reactive prepolymer comprises a copolymer of acrylamide and glycidyl methacrylate, wherein said copolymer is further functionalized with acrylic acid.

* * * * *